United States Patent [19]

Faitani et al.

[11] 4,151,713

[45] May 1, 1979

[54] BURNER FOR GAS TURBINE ENGINE

[75] Inventors: Joseph J. Faitani, East Hartford; William E. Woodburn, Jr., Rocky Hill, both of Conn.

[73] Assignee: United Technologies Corporation, Hartford, Conn.

[21] Appl. No.: 777,807

[22] Filed: Mar. 15, 1977

[51] Int. Cl.² ............................................. F02C 7/18
[52] U.S. Cl. .................................................. 60/39.65
[58] Field of Search ............ 60/39.36, 39.65, 39.74 R, 60/39.72 R

[56] References Cited

U.S. PATENT DOCUMENTS

| 3,430,443 | 3/1969 | Richardson et al. | 60/39.74 R |
| 3,498,055 | 3/1970 | Faitani et al. | 60/39.65 |
| 3,643,430 | 2/1972 | Emory et al. | 60/39.65 |

FOREIGN PATENT DOCUMENTS

| 2145891 | 3/1972 | Fed. Rep. of Germany | 60/39.65 |
| 892949 | 4/1962 | United Kingdom | 60/39.65 |
| 948128 | 1/1964 | United Kingdom | 60/39.65 |

OTHER PUBLICATIONS

"The Aircraft Gas Turbine Engine," Pratt & Whitney Oper. Instr. 200, May, 1974, p. 82.
"Design Consideration in Advanced . . . Combustors," Inter. Propulsion Symposium, Apr. 1967, Cranfield, Engl., pp. 3-5.
"The Rolls-Royce Spey Engine," Inter. Propulsion Symposium, Apr. 1967, Cranfield, Engl., pp. 58-63.

Primary Examiner—Robert E. Garrett
Attorney, Agent, or Firm—Norman Friedland

[57] ABSTRACT

This invention relates to means for minimizing the smoke emitted from the exhaust of a gas turbine engine by judiciously adding air to the primary burning zone of a combustor at discrete locations. This invention contemplates retrofitting existing burners by substituting the improvement for existing can burner components to obviate the necessity of replacing the entire combustor.

5 Claims, 7 Drawing Figures

BURNER FOR GAS TURBINE ENGINE

BACKGROUND OF THE INVENTION

This invention relates to combustors for gas turbine engines and particularly to means for reducing the smoke density of the exhaust emitted therefrom.

U.S. Pat. No. 3,498,055 granted to W. W. Mieczhowski, Jr. and myself on Mar. 3, 1970 and assigned to the same assignee addresses a similar problem and provides a solution by adding plunged holes to admit a critical amount of air to the primary combustion zone. The array of plunged holes is located on the liner of the burner can and is placed downstream of the fuel nozzle but within the primary combustion zone. This forms a single bank of plunged holes sized to provide the critical amount of air.

While the suggested arrangement of plunged holes and the critical air flow values may have been effective for smoke reduction in certain applications, this solution has not proven to be viable for other combustors.

We have found that we can obtain a relatively smokeless burner from an existing burner configuration while maintaining the necessary performance parameters which are acceptable for use in a gas turbine engine and without compromising burner efficiency. Unlike the means for reducing smoke emission in the structure described in U.S. Pat. No. 3,498,055, supra, we found that adding less than 6% air to the primary combustion zone proved to be critical for efficient combustion where the smoke emissions were sufficiently reduced and without impairing the other necessary burner operating parameters. As a matter of fact, to operate the burner and introduce a larger percentage of air would induce lean blowouts and render the combustor unsatisfactory for aircraft application.

Additionally, the judicial location of the holes and the number of holes have proven to be of significant consequence. For example, it was found that the proper introduction of air could not be emitted from a single bank of rows of holes and spaced rows of circumferential holes was necessary to the proper operation of the burner. The hole location between banks also proved to be critical to burner operation while effectuating smoke reduction.

SUMMARY OF THE INVENTION

An object of this invention is to provide for a combustor having at least a burner can which is configured to have a uniform circular cross section and centrally mounted tube for admitting cooling and combustion air, centrally of the primary combustion zone means to reduce smoke emittance from said burner.

A still further object is to provide for a burner can as described additional air holes on the center tube having two rows of circumferentially spaced holes each row contributing a critical amount of air to the burner can. The row closest to the fuel nozzles contains two holes per fuel nozzle and the row more remote from the fuel nozzle contains one hole per fuel nozzle and the hole in each row are symmetrical about the center line where the hole in the more remote location being located between adjacent holes in the row nearest the fuel nozzle. Additionally it was found that it was critical to size the hole in each row so that the percent of air admitted thereby relative to the total air is that the row closest to the nozzle admits between 1 and 1.5% of air and the more remote row of holes admit between 0.5% and 1% of air. Further, holes disposed on the outer cylindrical body having one row of circumferentially spaced holes contributes between 2.0 to 3.5% of the total air admitted to the burner can. The air holes in this row are clustered in groups of 3 holes per fuel nozzle in a symmetrical pattern about each fuel nozzle. Likewise the size of the hole in this row is critical and is dimensioned such that the percent of air admitted thereby relative to the total air is between 2.0 and 3.5% of air.

Other features and advantages will be apparent from the specification and claims and from the accompanying drawings which illustrate an embodiment of the invention.

DESCRIPTION OF THE PREFERRED EMBODIMENT

Figure 1:
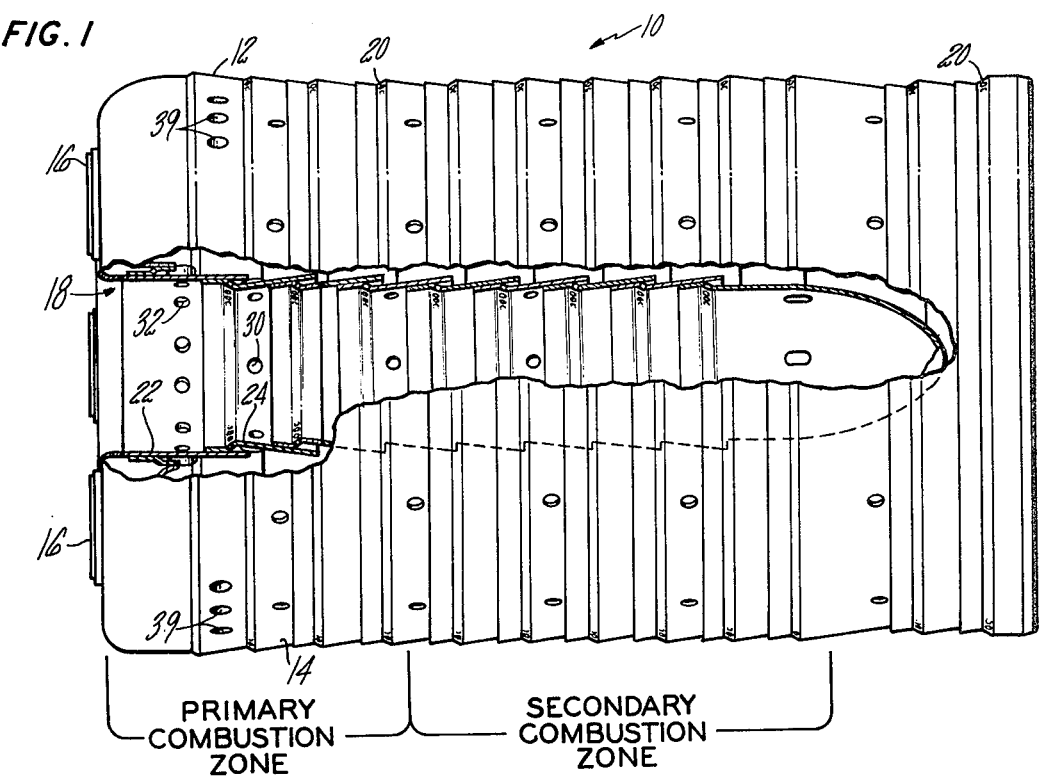
FIG. 1 is a side elevation view partly in section showing a burner can.
Figure 2:
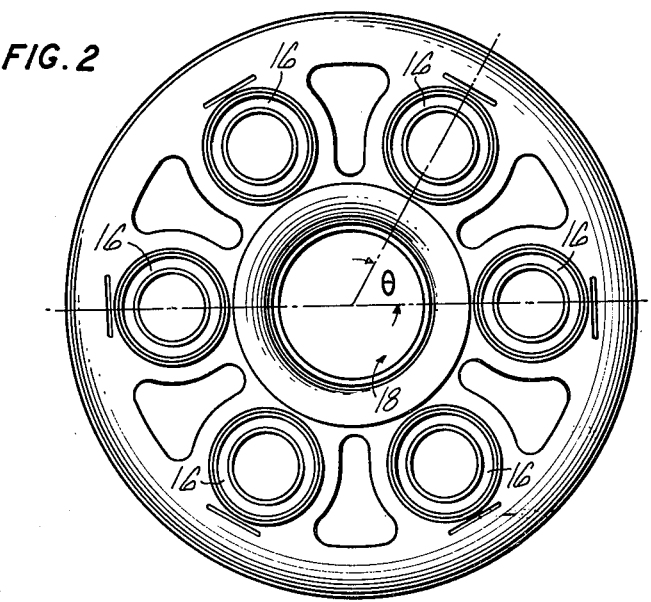
FIG. 2 is an end view showing an array of fuel nozzles for the burner can.

It should be understood that this invention has particular utility for a burner can adapted for a turbine type power plant as for example the JT-3D engine manufactured by the Pratt & Whitney Aircraft division of United Technologies Corporation the common assignee which is incorporated by reference herein. However, the invention as one skilled in the art will appreciate has applicability for other burner cans that are configured to include a plurality of front ended mounted fuel nozzles, and which includes a center tube for admitting cooling air and combustion air.

Referring now to FIGS. 1-5, the burner can generally illustrated by reference numeral 10 consists of a plurality of louver elements 12 joined to define a substantially uniform cylindrical body 14 defining the combustion chamber. The end closest to the compressor (not shown) is closed and the end closest to the turbine (not shown) is open. Typically, the combustion zones, well known in burner technology, are the primary zone located adjacent the fuel nozzles 16 and the secondary zone located downstream thereof. Inasmuch as the operation of combustors are well known, a detailed description thereof is omitted herefrom for the sake of simplicity and convenience, however for further details reference should be made to U.S. Pat. No. 3,498,055, supra. The heretofore existing burner can includes a centrally mounted tube 18 opened at the forward end for receiving air and closed at the rearward end terminating short of the end of the burner can. Equally well known is the fact that the burner can includes a plurality of strategically located apertures for providing combustion air, dilution air and louver cooling air to achieve optimum burning while assuring that the performance parameters like uniform exit temperature, low pressure drop, etc. are achieved.

The tube member 18, like the outer liner 12, is fabricated from individual louvers suitably joined, say by welding, to form the bullet shaped tube. Each louver in the tube, like the liner 12, carries a plurality of circumferentially spaced cooling holes 20 to achieve film cooling in a well known manner and a plurality of circumferentially spaced holes 70 admit combustion and dilution air.

Figure 3:
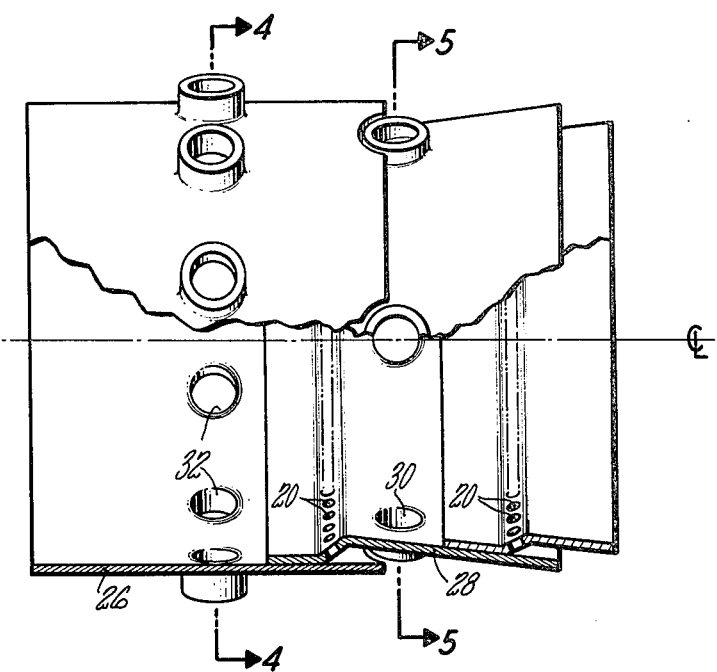
FIG. 3 is a side elevation view partly in section of the center tube enlarged to emphasize the means for improving smoke reduction.
Figure 4:
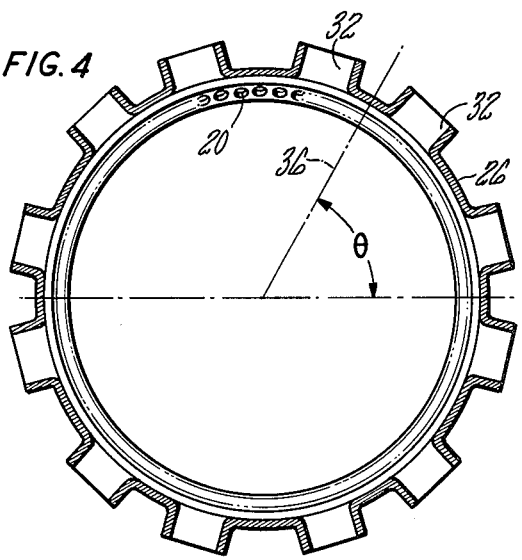
FIG. 4 is a view in section taken along line 4—4 of FIG. 3.
Figure 5:
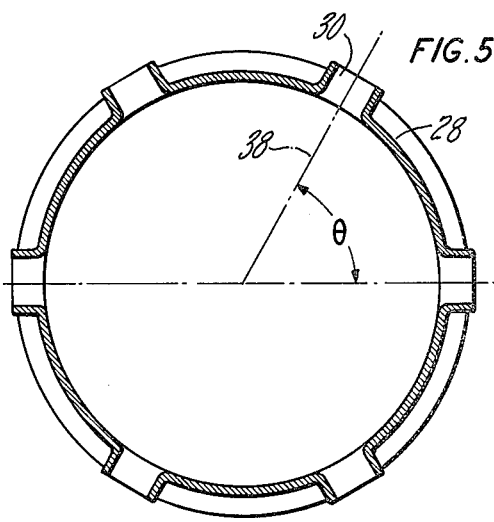
FIG. 5 is a view in section taken along line 5—5 of FIG. 3.

According to this invention, louvers represented by louvers 22 and 24 which heretofore had no holes located adjacent the primary combustion zone was replaced by the louver elements 26 and 28 depicted in FIGS. 3-5. (The drawings represent the combustor after the improvement). Each louver element contains a plurality of circumferentially mounted holes having a given relationship to the fuel nozzles. As noted from FIG. 2 this configuration includes six fuel nozzles 16, each being identical and referenced with the same reference numeral, spaced symmetrically around the burner axis. Apertures 30 in louver element 28 are symmetrically spaced about the tube center line and are phased or in coincidence with center lines of fuel nozzles 16. These tubed holes are dimensioned to provide between 0.5% and 1% of the total air into the combustor, noting that there is one tubed hole for each fuel nozzle.

Figure 6:
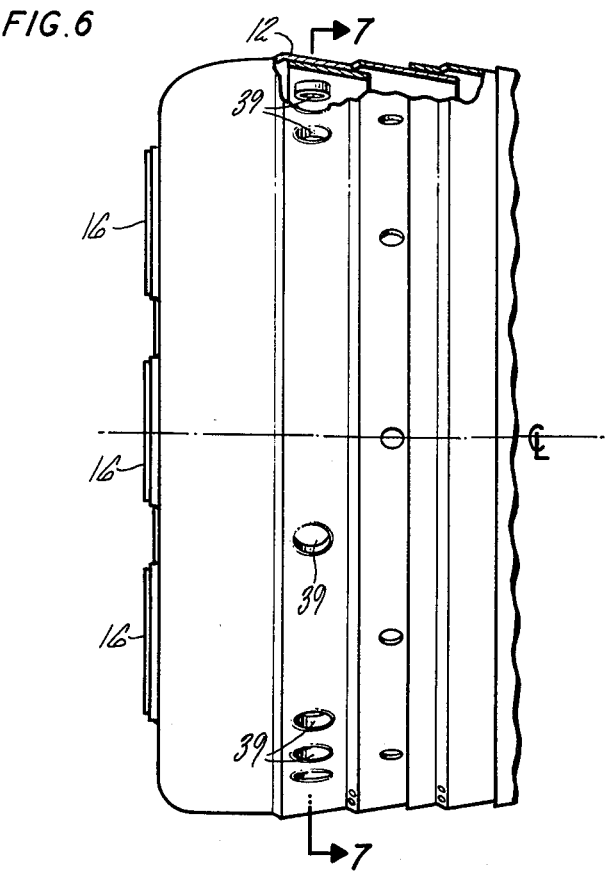
FIG. 6 is a side elevation view partly in section of the cylindrical outer body to emphasize the means for improving smoke.
Figure 7:
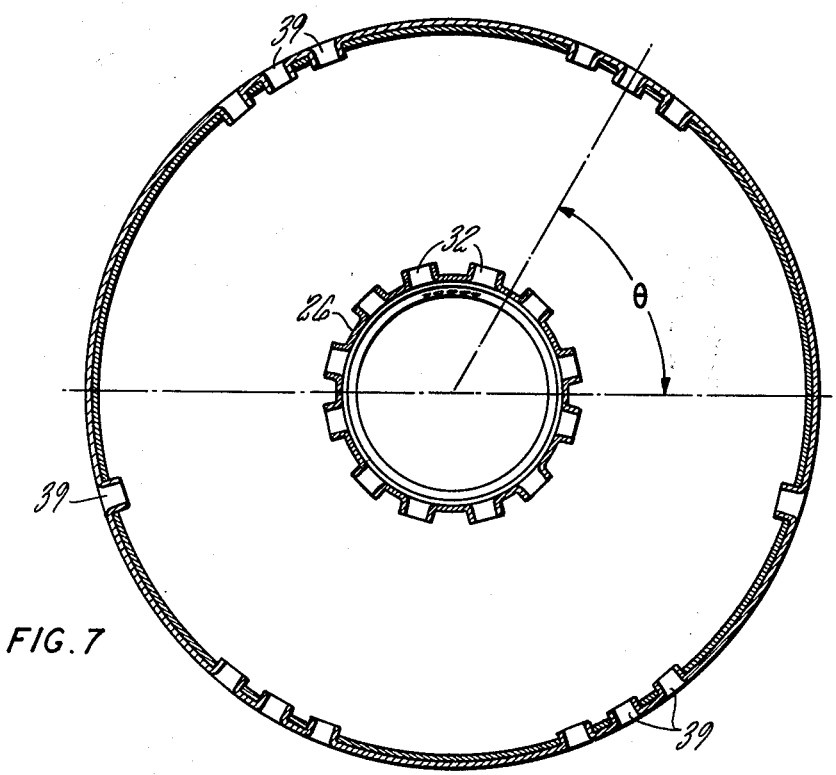
FIG. 7 is a view in section taken along line 6—6 of FIG. 6.

Louver element 26 includes a plurality of tubed holes 32 ganged in pairs and each pair is symmetrically spaced about the tube center line. It is important that each pair be particularly located with respect to the holes 30 in louver 28, noting that the radius 36 which equally divides adjacent ganged tubed holes 32 lies in a plane that is in coincidence with the radius 38 forming the center line of tubed hole 30. Thus the three holes 32, 32 and 30 as shown in FIGS. 4 and 5 form a particular pattern relative to the location of the fuel nozzles. Also, it will be appreciated that the ganged holes 32, 32 straddling radius 36 are spaced closer to each other as compared to the next adjacent ganged holes 32, 32. The percentage of air relative to total combustor air flowing through holes 32 must fall within the range of between 1.0% and 1.5%. Obviously the total percentage of air contributed by plunged holes 30 and 32 fall within the range 1.0% and 2.5%. In actual test it was found that acceptable smoke reduction was achieved without any adverse effects on combustion performance by sizing tubed holes 32 to provide 1.18% and tubed holes 30 to provide 0.79% of the total combustion air. To obtain the optimum reduction in smoke density an additional plurality of circumferentially mounted holes 39 having a given relationship to the fuel nozzle is incorporated on the outer cylindrical body in the primary combustion zone as shown in FIGS. 6 and 7. Apertures 39 in louver element 12 are symmetrically spaced about the burner center line and are phased with the center lines of the fuel nozzle 16. These tubed holes are grouped in clusters of three holes per fuel nozzles similarly to the cluster of holes in the center tube. For assembly purposes, it was found necessary in this particular embodiment to mount the cross over tubes at a certain cluster of holes, necessitating the elimination of some of the holes. As will be appreciated from FIGS. 2, 4, 5 and 7, the angle $\theta$ is equal, illustrating the relationship of these smoke reducing holes to each other and to the fuel nozzles. The percentage of air relative to the total combustor air flowing through apertures 39 must fall within the range of between 2.0 and 3.5%. In actual test it was found that acceptable smoke reduction was achieved without any adverse effects on combustor performance by sizing tubed holes 39 to provide 3.12% of the total burner air flow. Hence, percent of air designed for smoke reducing purposes amounted to 5.09% of of the total air admitted to the combustor adapted for aircraft use.

What has been shown is a relatively simple, inexpensive way in which to reduce smoke density of the gases emitted by a combustor without adversely affecting the burner performance parameters. While this invention contemplates modifying or retrofitting existing combustors, it will be understood that new combustors would incorporate this feature.

It should be understood that the invention is not limited to the particular embodiments shown and described herein, but that various changes and modifications may be made without departing from the spirit or scope of this novel concept as defined by the following claims.

We claim:

1. Means for reducing the smoke density of a combustor having an outer liner having a plurality of cooling and combustion holes defining a primary and secondary combustion zone, being closed at one end and opened at the opposite end, a centrally disposed tube extending inwardly from said closed end, opened at its upstream end for feeding air to a plurality of cooling and combustion holes, and closed at its downstream end, said smoke density reducing means including a first and second bank of a plurality of circumferentially spaced holes disposed in the wall of said tube in proximity to said primary combustion zone and being dimensioned for ingressing air in the range of 1.5 to 2.5 percentage relative to the total amount of air ingested by said combustor, the holes in said downstream bank of holes being disposed in out of phase relationship with the holes in the upstream bank of holes and defines therewith a cluster of three holes.

2. Means as in claim 1 including a plurality of holes circumferentially spaced about the combustor center line formed in said outer line in proximity to said primary combustion zone and being dimensioned for ingressing air in the range of 2.0 to 3.5 percentage of the total amount of air ingested by said combustor.

3. Means as in claim 1 wherein said outer wall of said combustor and said tube wall is fabricated from a plurality of circular louver elements extending in each adjacent louver element being attached to each other to define said combustion zone, said first bank of circumferentially mounted holes in an upstream louver and said second bank of circumferentially mounted holes formed in a downstream adjacent louver.

4. Means as in claim 3 wherein the number of said downstream bank of holes are sized so as to ingress air in the range of 0.5 to 1.0 percentage of air relative to the total air in said combustor.

5. Means as in claim 3 wherein the number of said upstream bank of holes is twice the number of said holes in the downstream bank of holes and ingresses air in the range of 1.0 to 1.5 percentage of air relative to the total air in said combustor.

* * * * *